United States Patent
Gonzalez et al.

(10) Patent No.: US 9,621,432 B2
(45) Date of Patent: Apr. 11, 2017

(54) DIAGNOSTICS OF DEPLOYED DEVICES BASED ON NETWORK TRAFFIC

(71) Applicant: GCI Communication Corp., Anchorage, AK (US)

(72) Inventors: Wendy Gonzalez, Los Gatos, CA (US); Mark Doyle, Portland, OR (US); Darrin Johnson, Graham, WA (US); Craig Mischenko, Wasilla, AK (US)

(73) Assignee: GCI Communication Corp., Anchorage, AK (US)

( * ) Notice: Subject to any disclaimer, the term of this patent is extended or adjusted under 35 U.S.C. 154(b) by 175 days.

(21) Appl. No.: 14/447,982

(22) Filed: Jul. 31, 2014

(65) Prior Publication Data
US 2016/0036647 A1    Feb. 4, 2016

(51) Int. Cl.
*H04L 12/24* (2006.01)
*H04L 12/26* (2006.01)
*H04W 24/08* (2009.01)

(52) U.S. Cl.
CPC ........ *H04L 41/147* (2013.01); *H04L 41/0883* (2013.01); *H04L 43/16* (2013.01); *H04W 24/08* (2013.01); *H04L 43/062* (2013.01)

(58) Field of Classification Search
CPC ..... H04L 1/1887; H04L 5/0055; H04L 1/188; H04L 43/16; H04L 51/04; H04W 8/005; H04W 24/08; H04W 28/02
See application file for complete search history.

(56) References Cited

U.S. PATENT DOCUMENTS

| | | | | |
|---|---|---|---|---|
| 2006/0285487 A1* | 12/2006 | Yasuie | ............... | H04L 41/0681 370/216 |
| 2014/0052825 A1* | 2/2014 | Luecke | ................. | H04L 67/327 709/219 |
| 2014/0129552 A1* | 5/2014 | Sinha | ..................... | G06Q 50/01 707/724 |
| 2015/0049657 A1* | 2/2015 | Cheng | ................. | H04W 52/028 370/311 |
| 2015/0100887 A1* | 4/2015 | Verkasalo | ............. | G06F 3/0482 715/735 |
| 2015/0223276 A1* | 8/2015 | Belogolovy | ........... | G06F 1/1635 370/338 |

(Continued)

*Primary Examiner* — Andrew Chriss
*Assistant Examiner* — Romani Ohri
(74) *Attorney, Agent, or Firm* — Lee & Hayes, PLLC (57) ABSTRACT

This disclosure is directed to performing diagnostics on deployed devices that use network connectivity to transmit data in response to at least partially automated processes. In some embodiments, a diagnostic entity may monitor network traffic from deployed devices. The diagnostic entity may aggregate at least some of the network traffic to create profiles for at least some of the deployed devices and/or for some activities. The diagnostic entity may then identify outlier devices/activities from observed network behavior of deployed devices and/or activities based on the accessed network traffic and the profiles. The diagnostic entity may generate reports and/or perform or cause some corrective operations in response to identification of the outliers. In various embodiments, the diagnostic entity may predict network usage information for a group of devices and may possibly suggest revisions to service plans and/or usage of the deployed devices based at least partly on the predicted usage.

16 Claims, 8 Drawing Sheets

(56) References Cited

U.S. PATENT DOCUMENTS

2016/0037364 A1* 2/2016 Kairouz ............... H04W 24/08
370/252
2016/0037386 A1* 2/2016 Pitchaiah .............. H04W 28/20
709/226

* cited by examiner

DIAGNOSTICS OF DEPLOYED DEVICES BASED ON NETWORK TRAFFIC

BACKGROUND

Networked devices are deployed in many applications to collect data, streamline and/or automate processes, monitor activities, and for other reasons. Some examples of these networked devices include fitness tracking devices, animal tags used for monitoring animals, lighting system controls, food and drink machines, payment service machines (e.g., parking meters, ticket dispensing machines, etc.), and automated teller machines (ATMs). These networked devices rely on networks to exchange information to and from a host device. However, these communications are often partially or fully automated, and thus do not require a user to request data from a particular device. In some instances, the networked devices may require or utilize an intermediary device to facilitate network connectivity, such as a fitness tracking device uploading data through a personal computer of a user.

An example of possible network communications may be illustrated by operation of a network-based parking meter. The parking meter may process payment instruments for users, and then transmit payment information over a network. Thus, these parking meters may not require an attendant to collect money from a storage receptacle in the parking meter, as was common with older parking meters. Besides payment information, the parking meters may transmit other information across a network, such as maintenance requests, activity reports, and so forth. The parking meters may receive data in some instances such as software updates or status requests. In some instances, a service technician may communicate directly with the particular parking meter to perform various operations, such as perform manual diagnostics.

The networked devices communicate with host devices through one or more service providers that provide connectivity between the networked devices and the host devices. For example, the host devices may be owned or controlled in part by a company that runs or manages the parking meters. To communicate with the networked devices, the host devices may use application program interfaces (APIs) or other custom software that is specific to a particular type of networked device. Using such software, the host devices may make requests for data from the networked devices, interpret data received from the networked devices, and/or otherwise interact with the networked devices. However, in some instances, the host devices may lack diagnostic tools to monitor, maintain, and/or service some or all deployed networked devices. In addition, creation of specific software for each networked device can be expensive and time consuming.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed to performing diagnostics on networked devices that are deployed in various locations based at least in part on network traffic received from the deployed devices and/or network traffic sent to the deployed devices.

As used herein, the term "deployed device" refers to any type of automated or partially automated device that transmits data, either directly or through an intermediary device, to a host device via one or more networks. The deployed device may be an endpoint network-based device or may be an intermediary network based device. The host device (or devices) may be managed by or controlled by an entity that oversees the deployment or operation of the deployed devices. In some embodiments, the deployed devices perform machine-to-machine communications, which are partially or fully automated communications from the deployed devices to the host devices. Example communications may include individual or batch processing of information, such as processing of payment information, status information, alerts, location updates, and/or other types of data (e.g., fitness data, machine operation data, etc.). Example deployed devices include, without limitation, fitness tracking devices, animal tags used for monitoring animals, lighting system controls, food and drink machines, payment service machines (e.g., parking meters, ticket dispensing machines, etc.), and automated teller machines (ATMs). However, the deployed devices may include virtually any type of device that transmits data packets across a network.

These deployed devices may be monitored by a third party that has access to network activity of the deployed devices. The third party, referred to herein as a "diagnostic entity," may not be able to decipher all data within data packets that are exchanged between a host device and a deployed device, but may extract some various types of information and metadata. For example, the diagnostic entity may determine and/or derive at least some of the following: a size of the packet, a location associated with the deployed device (e.g., possibly derived from an Internet Protocol (IP) address), a device type, a customer, a host, historical information related to the device, and so forth. However, this information may not include any information that is included in a payload of the packet, which may be proprietary information. In some embodiments, the diagnostic entity may perform other functions, such as monitor and processing billing for services providers that process network traffic, and/or perform other processes related to network operation and/or management.

The diagnostic entity may perform various diagnostic actions. In some embodiments, the diagnostic entity may monitor network traffic, such as by monitoring data packets exchanged between host devices and deployed devices. The diagnostic entity may aggregate at least some of the network traffic to create profiles for at least some of the deployed devices and/or for some activities. The diagnostic entity may then identify outlier devices/activities from observed behavior of deployed devices and/or activities based on the accessed network traffic and the profiles. The diagnostic entity may generate reports and/or perform or cause some corrective operations in response to identification of the outliers, such as deprovisonoing the device or suspending it. In various embodiments, the diagnostic entity may predict network usage information for a group of devices and may possibly suggest revisions to service plans and/or usage of the deployed devices based at least partly on the predicted usage as compared to prior usage.

The techniques and systems described herein may be implemented in a number of ways. Example implementations are provided below with reference to the following figures.

Illustrative Environment

Figure 1:
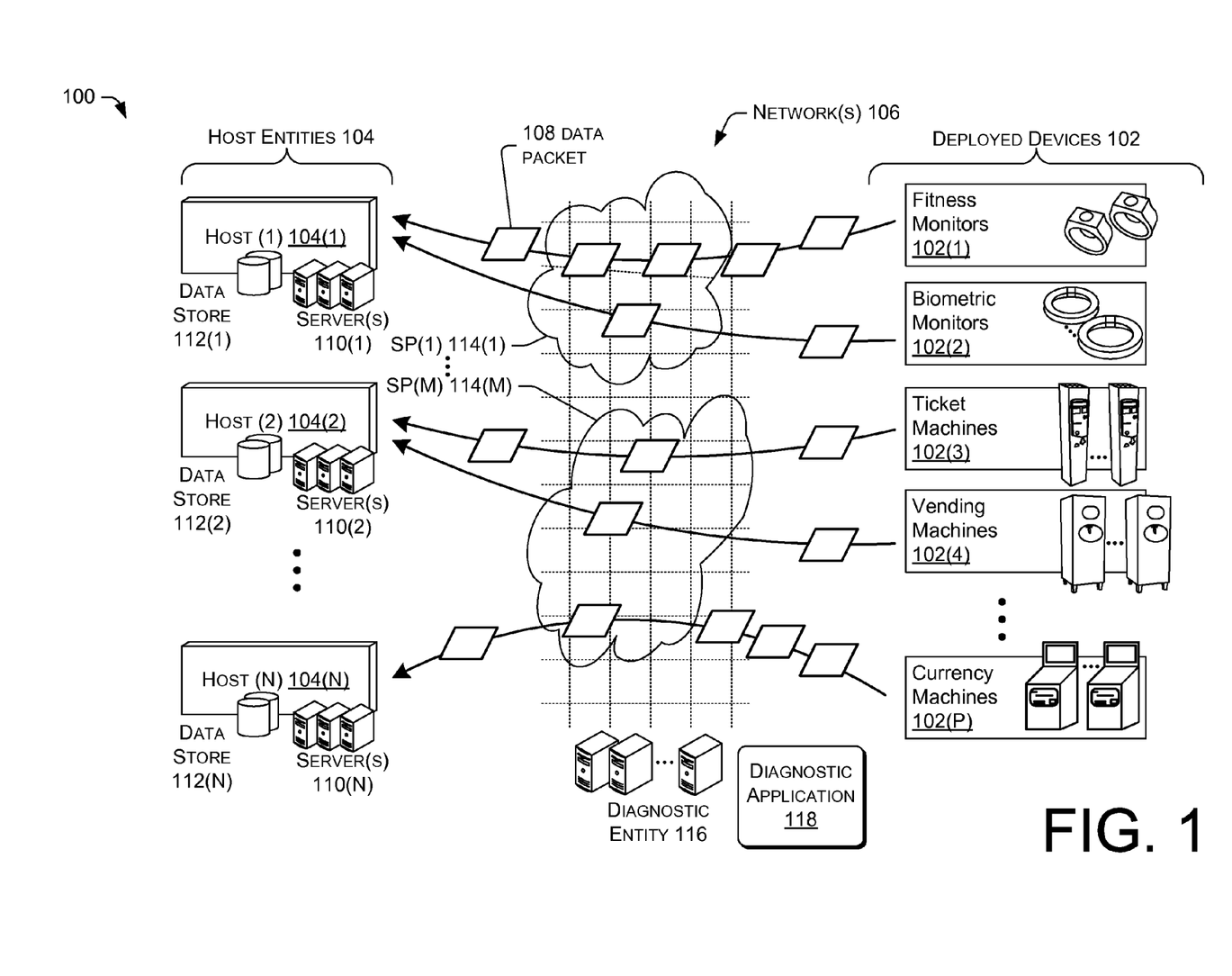
FIG. 1 is a schematic diagram of an illustrative networking environment to perform diagnostics of deployed devices based on network traffic.

FIG. 1 is a schematic diagram of an illustrative networking environment 100 to perform diagnostics of deployed devices based on network traffic. The environment 100 includes deployed devices 102 that transmit data to host entities 104 via one or more networks 106. The network(s) 106 may include any type of wired and/or wireless networks.

The deployed devices 102 may be any type of automated or partially automated devices that transmit data, either directly or through an intermediary device, to one of the host entities 104 via the network(s) 106. An intermediary device may be a relay device, a personal computer used to upload data from a deployed device (e.g., fitness monitor or watch), or any other device that facilitates transmission of data between the deployed devices 102 and the host entities 104. Examples, although not an exhaustive listing, of possible deployed devices 102 may include fitness monitors 102(1) (e.g. fitness watches, fitness bands, pedometers, etc.) and biometric monitors 102(2) (e.g., medical equipment, animal tags, etc.) which may be used to track information associated with people or animals (e.g., vitals, location, etc.). Other types of example deployed devices may include ticket machines 102(3) (e.g., parking meters and/or other ticket dispensing machines), vending machines 102(4) (e.g., food/drink machines and/or other product vending machines), and/or currency machines 102(P) (e.g., ATMs, currency exchange machines, and/or other currency machines). However, other types of deployed devices may communicate data, via the network(s) 106, to the host entities 104.

The host entities 104 may receive data packets 108 from the deployed devices 102. In some embodiments, a particular host entity, such as a first host 104(1) may receive data packets 108 from some of the deployed devices 102, such as the fitness monitors 102(1) and the biometric monitors 102(2), for example. A second host 104(2) may receive data packets 108 from other deployed devices 102, such as the ticket machines 102(3) and the vending machines 102(4) while a third host 104(N) may receive data packets 108 from the currency machines 102(P), for example. A host entity may be an owner or controller that runs or manages a set of deployed devices 102. For example, a host entity may be a company that owns or controls operation of a specific type of deployed device or multiple types of deployed devices that are deployed across a region or another area. The host entities 104 may include servers 110 that exchange data with the deployed devices, process the data packets, and/or perform other operations. The host entities 104 may include data stores 112 that store information about some of the deployed devices 102 and/or other information.

In some embodiments, the host entities 104 may communicate with the deployed devices 102 using APIs or other specific/custom software that is specific to a particular type (e.g., model, operating system, etc.) of deployed device that allows the host entities 104 to decipher data in the data packets 108 received from the deployed devices 102. Using such software, the host devices 104 may make requests for data from the deployed devices, interpret data received from the deployed devices, and/or otherwise interact with the deployed devices. Often, the host entities 104 utilize the specific software to communicate directly with individual deployed devices rather than perform analytics on a group of the deployed devices. In some embodiments, the deployed devices 102 may automatically transmit the data packets to the host entities 104 without a request from the host entities and/or without a request from a user.

As shown in the environment 100, various service providers 114 (e.g., a first service provider (SP) 114(1), . . . a last service provider 114(M)) may provide network services for one or more of the host entities 104 to support communications with associated ones of the deployed devices 102. In some embodiments, a service provider may service all deployed devices of a specific type; however, other service providers may also service a same type of deployed device. Because deployed devices may operate using multiple services providers (e.g., some devices with a first service provider, other devices with a second service provider, and so forth), the service providers may not have visibility to transmission of a diverse set of data packets from all of the deployed devices, but instead may only have visibility to information from some of the deployed devices that are associated with connectivity through a same service provider. This may also be true for the host entities.

Meanwhile, a diagnostic entity 116 may monitor network activity associated with multiple service providers and/or multiple host entities. In some embodiments, the diagnostic entity 116 may be associated with another service provided by an entity, such as a billing service, maintenance service, auditing service, or other service used by the host entities 104 and/or the service providers 114. The diagnostic entity 116 may perform various diagnostics, using a diagnostic application 118 (or platform), which may then be used to provide diagnostic information to one or more entity associated with a group of the deployed devices and/or to otherwise act on such information (e.g., cause a deployed device to be reset, disconnected, provisioned, serviced, etc.).

The diagnostic entity 116 may have access to at least some information about the data packets 108 transmitted across various service providers and/or various host entities. For example, the diagnostic entity 116 may have access to a size of a packet, an identity of a sender of the packet (e.g., a type of the deployed device), an identity of a recipient of the packet (e.g., the host entities), corresponding communication addresses, a time of transmission, and so forth. The diagnostic entity 116 may also have access to other types of data, such as historical data for the deployed devices (which may be previously monitored data obtained by the diagnostic entity 116) and so forth. Thus, the diagnostic entity 116 may determine a schedule of transmissions, average packet sizes and/or other data for groups of deployed devices. This information may be used to create profiles, which may be used to determine information about individual deployed devices that may not be functioning properly or may be functioning different than expected (e.g., sending packets more or less frequently than expected, sending packets of an atypical size, etc.). However, this information may not include any information that is included in a payload of the packet, which may be proprietary information. Thus, the diagnostic entity 116 may be unable to decipher at least some information in the payload of the data packet 108. In some instances, the data in the payload of the packet may be encrypted.

The diagnostic entity 116 may use a plurality of computing devices to perform the monitoring. The diagnostic entity 116 may employ the diagnostic application 118 to process information about the data packets 108 for diagnostic purposes, as explained in further detail below. By having access to data packets transmitted across various service providers and/or various host entities, the diagnostic application 118 may be capable of capturing unique information that may not be attainable by the individual parties (e.g., by a single one of the host entities or a single one of the service providers). Further, through analysis of the monitored data by the diagnostic application 118, the diagnostic entity 116 may provide useful diagnostic information to the host entities 104, the service providers 114, the deployed devices 102, and/or other entities associated with the deployed devices.

Various examples follow involving diagnostics of deployed devices by the diagnostic entity 116. In a first example, the diagnostic entity 116 may identify data packets transmitted by a particular type of ticket generating machine, such as an automated self-service parking meter that issues parking passes to customers after processing a customer's payment card (e.g., credit card, debit card, etc.). The diagnostic application 118 may monitor data packets to/from the parking meters and create one or more profiles of expected behavior of the transmissions for the parking meters. The profiles may be based on different regions, different models of the parking meters, different service providers associated with the parking meters, different host entities associated with the parking meters, and/or based on other attributes of the parking meters. For example, a profile may include an expected size of a packet, a schedule of when the packets are expected to be transmitted/received, expected location information associated with each deployed device (e.g., mobile vs. immobile deployed device, etc.), and/or other possible information extracted from the data packets over time.

Once the profiles are created for these parking meters, the diagnostic application 118 may diagnose deployed devices based on data packets received from those devices or a lack of data packets received from those devices. As an example, the diagnostic application 118 may determine a profile for the parking meters that includes a fairly consistent size packet (e.g., the packets may typically carry payment information to be processed by a payment processor), a consistent location (e.g., non-movable parking meters), an expected frequency of packets (e.g., possibly with a large variation), and so forth. From this information, the diagnostic application 118 may identify parking meters that are not functioning properly (e.g., packet size is atypical, frequency is too frequent or infrequent, etc.), that stop functioning (e.g., no further packets received), that are relocated and are possibly stolen (e.g., location changes), and so forth.

Additional analytics and/or diagnostics may also be performed. For example, the diagnostic application 118 may determine how many parking meters need service or become non-operations in a given amount of time. The diagnostic application 118 may determine how many parking meters have downtime of a certain amount (and then resume operation) during a given amount of time. The diagnostic application 118 may determine how often the parking meters are reset (assuming a reset command is identifiable). This type of information may be useful to various parties, such as a manufacturer, a potential customer of more of these parking meters, a current owner of the parking meters (possibly for baseline comparisons, etc.), and/or for other reasons. In some embodiments, the diagnostic application 118 may be relied upon by the host entity, at least partly, to provide indications when particular devices are to be serviced, reset, disconnected, provisioned, or otherwise inspected or scheduled for follow up service.

In a second example, the diagnostic application 118 may identify data packets transmitted by animal tags that are associated with particular livestock or animals. The diagnostic application 118 may monitor data packets from the animal tags and create one or more profiles of expected behavior of the transmissions for the animal tags. The profiles may be based on different regions, different owners of the animals, and so forth. For example, a profile may include an expected size of a packet, a schedule of when the packets are expected, expected location information associated with each deployed device (e.g., mobile vs. immobile, etc.), and/or other possible information extracted from the data packets over time. In some instances, the packets may be transmitted by an intermediary device, such as a device that reads the animal tag and then transmits information along with the animal tag via a data packet. Thus, the animal tags may be deployed using radio frequency identifiers (RFIDs) or other similar technologies.

Once the profiles are created, the diagnostic application 118 may diagnose deployed devices based on data packets received from those devices or a lack of data packets received from those devices. As an example, the diagnostic application 118 may determine information about a population of animals such as life spans of associated animals (duration of use of a particular animal tag), sales of animals (transfer to another location), devices that transmit too much or too little information (based on the size of the data packets, etc.). Although a host entity that receives some of the data packets may be able to determine some of this information, such entities may not have software configured to determine such information from an aggregate number of deployed devices. Further, such entities may be limited to analysis of only devices that they control or own, rather than a larger group of devices that transmit the data packets across the network(s) 106. Thus the diagnostic application 118 may be able to perform diagnostics across various regions (or by regions), that may otherwise not be possible by a host entity that is constrained to a single region, for example.

As a third example, the diagnostic application 118 may identify data packets transmitted by a drink machine, such as a vending machine that makes self-service drinks. The diagnostic application 118 may monitor data packets from the drink machines and create one or more profiles of expected behavior of the transmissions for the drink machines The profiles may be based on different regions, different customers (convenience stores, versus other locations, etc.), and/or other factors. For example, profiles based on region may be important based on different temperatures in the various regions, different population densities, and/or for other reasons. For example, a profile may include an expected size of a packet at a particular time, such as a packet that confirms that the devices has performed and completed a sanitization process. Other packets may indicate use of the drink machine, such as packets of a particular size which may carry order information (e.g., specifics about a type and size of drink made, etc.), and/or payment information. The diagnostic application 118 may identify these packets based on size, timing, or other attributes (possibly a packet code that indicates generic information about the contents of the packet). This information may be used to prompt reorder of supplies, such as sanitization agents, filters, maintenance service (e.g., deep cleaning, etc.), or other supplies and/or services.

As shown by the prior examples, diagnostics of data packets transmitted through one or more networks may provide various types of information that may be may used in reports and/or used for corrective operations. Many other examples exist, such as diagnostics of remotely controlled lighting systems, security systems, and/or other network controlled devices. Further descriptions of the diagnostic entity 116 and the diagnostic application 118 are provided below.

Illustrative Computing Architecture

Figure 2:
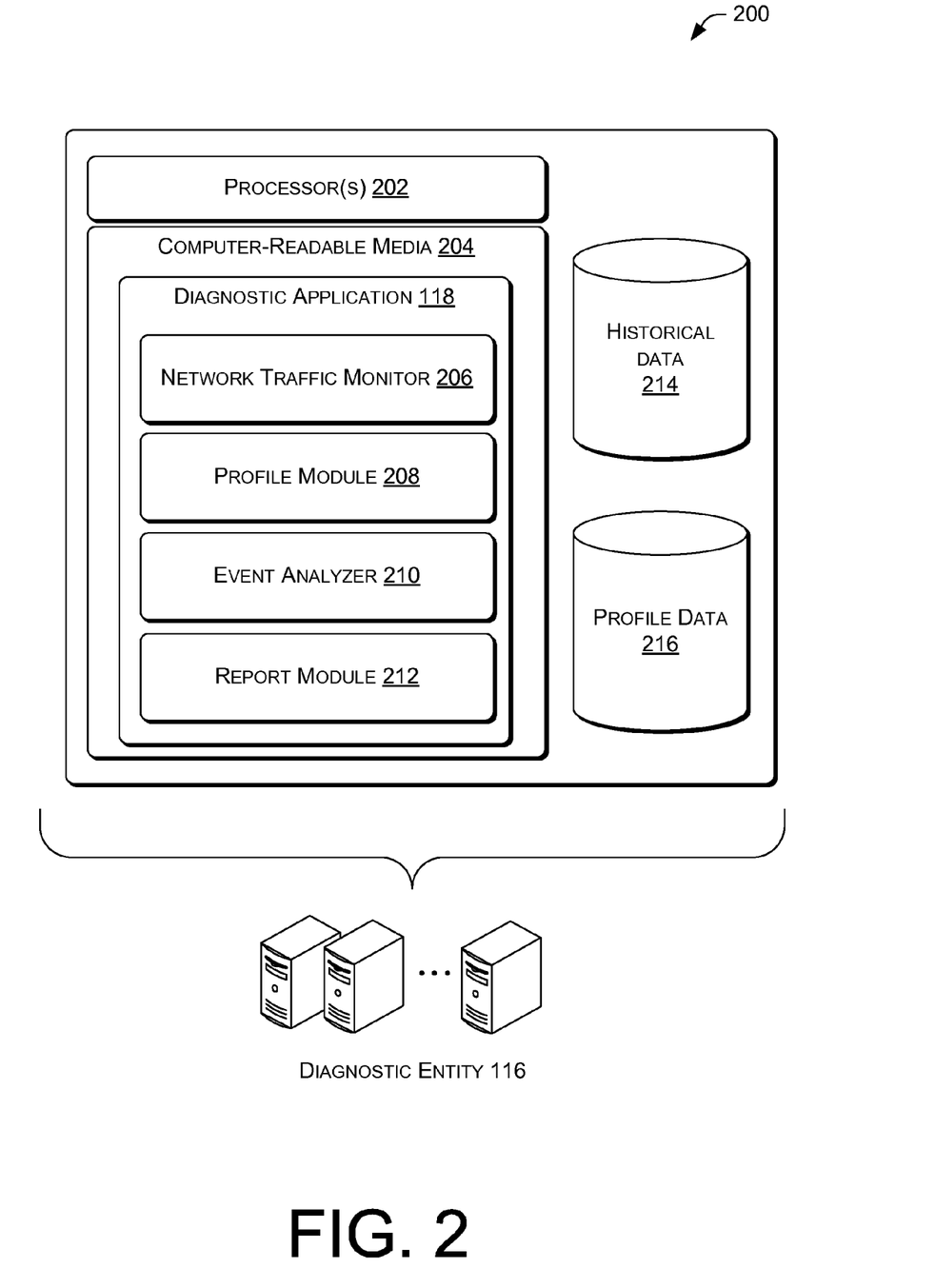
FIG. 2 is a block diagram of illustrative computing architecture of the diagnostic entity shown in FIG. 1.

FIG. 2 is a block diagram of illustrative computing architecture 200 of the diagnostic entity shown in FIG. 1. The computing architecture 200 may be implemented in a distributed environment (e.g., virtual machines, cloud services, etc.) or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the diagnostic application 118.

Embodiments may be provided as a computer program product including a non-transitory machine-readable storage medium having stored thereon instructions (in compressed or uncompressed form) that may be used to program a computer (or other electronic devices) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions.

Further, embodiments may be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store the diagnostic application 118 that may include various software components including a network traffic monitor 206, a profile module 208, an event analyzer 210, and a report module 212, which are described in turn. The components may be stored together or in a distributed arrangement. The computing architecture 200 may further include historical data 214 and profile data 216.

The network traffic monitor 206 may monitor traffic (e.g., transmission of the data packets 108, etc.) through the one or more networks 106 to identify data packets and obtain information about the data packets. The network traffic monitor 206 may determine interaction between a device and the network. For example, the network traffic monitor 206 may determine when a device becomes active on a network (e.g., via a location registration, etc.), changes network, and/or otherwise interacts with the network. The network traffic monitor 206 may store collected information in the historical data 214. In some embodiments, the network traffic monitor 206 may serve other purposes, such as to determine usage of data for billing purposes, auditing purposes, and/or for other reasons. The network traffic monitor 206 may track information about the data packets for diagnostic purposes. The network traffic monitor 206 may collect information used by the profile module 208 to create profiles associated with various groups of deployed devices. Once the profiles are established, the network traffic monitor 206 may provide data inferred from the data packets to the event analyzer, which may compare information or events to corresponding information/events in the profiles to identify diagnostic information about one or more of the deployed devices.

The profile module 208 may create profiles for groups of deployed devices based at least in part on the historical data 214. The profiles may be stored in the profile data 216. For example, the profile module 208 may automatically, or possibly with some human intervention, perform analysis on historical data 214 to create baseline data about groups of deployed devices. This baseline data may represent devices that are operational and are operating as intended. The baseline data may include averages and/or median values for attributes of the data packet (e.g., size, frequency, etc.), and corresponding thresholds, which may indicate which deployed devices to report or that may benefit from corrective action. In some embodiments, threshold variances may be established by the profile module 208, which may indicate whether a deployed device is operating as expected (within the threshold variance) or not operating as expected (outside of the threshold range). The profiles may include data derived from multiple packets, such as frequency of receipt of packets, which may require receipt of two or more packets to determine frequency information. As illustrative in FIG. 1, the data packets 108 may be transmitted at different frequencies. In various embodiments, the profile module 208 may create various profiles for a particular group of deployed devices. In some embodiments, various deployed devices may be associated with some similar and some different profiles based on the type of deployed device, the location of the deployed device, and/or other attributes of the deployed devices.

The event analyzer 210 may process information about a data packet, and then use that information along with the profile data 216 to diagnose an associated deployed device or group of deployed devices. For example, if the event analyzer 210 receives a data packet, determines a corresponding profile, and then determines that information about the data packet falls outside of a threshold variance of the profile (or a particular attribute in the profile such as packet size, location, timing, etc.), then the event analyzer 210 may determine that a diagnostic event has occurred and may pass this information to the report module 212 for further processing. However, if the event analyzer 210 determines that information about the data packet falls inside of a threshold variance of the profile, then the event analyzer 210 may take no further action. Meanwhile, the traffic profile module 208 may use that information to update the profile at some point in time (e.g., during a future update interval, etc.). In some instances, the event analyzer 210 may determine that an event has not occurred as expected, such as when a data packet is not received for a threshold amount of time. In this example, the trigger may be a passage of time rather than receipt of a data packet.

In some embodiments, the event analyzer 210 may process queries on the historical data 214 to diagnose or retrieve specific data regarding operation or activities associated with the deployed devices. The queries may be custom generated to determine specific information from the historical data 214, possibly using the profile data 216. For example, an entity associated with a group of deployed devices may request specific information about the deployed devices, such downtime information and/or other types of information that can be inferred from monitoring transmission of data packets from these deployed devices.

The report module 212 may output information such as reports and/or cause corrective action to take place. For example, the report module 212 may transmit a notification or message to an entity in response to a diagnosis that one or more deployed device is operating outside of an expected threshold variance for a particular profile associated with the deployed device(s). This report may be transmitted to a corresponding host entity, a service provider, an end user, a customer, and/or any other party associated with the deployed device that may desire such information (e.g., a store owner that use the deployed device on her property, etc.). In various embodiments, the report module 212 may cause corrective action to be initiated, such as by causing a deployed device to be reset, disconnected, provisioned, causing a deployed device to be serviced by software or by a human, and/or by taking other corrective action. For example, a device may be provisioned to update software/firmware of the device and/or otherwise change operation of the device. For example, provisioning may add a profile to a device to allow the device to correctly operate on a new or existing network.

Further information about operations of the diagnostic entity 116 and diagnostic application 118 are described below with reference to illustrative operations.

Illustrative Operations

FIGS. 3-6 show illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
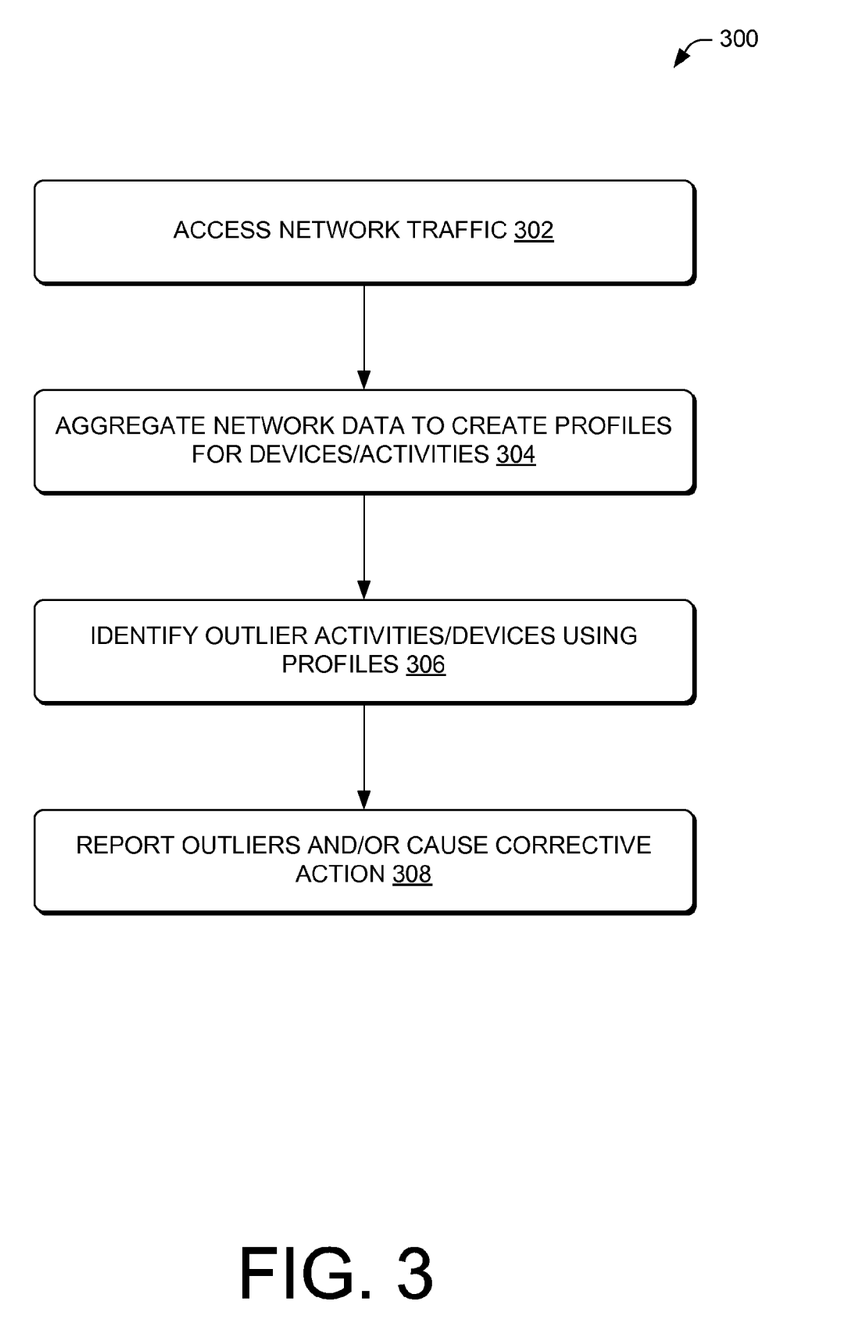
FIG. 3 is a flow diagram of an illustrative process to diagnose deployed devices based on network traffic.

FIG. 3 is a flow diagram of an illustrative process 300 to diagnose deployed devices based on network traffic. The process 300 is described with reference to the environment 100 and the computing architecture 200. Of course, the process 300 may be performed in other similar and/or different environments.

At 302, the network traffic monitor 206 may access network traffic 302. For example, the network traffic monitor 206 may access information about the data packets 108 that are exchanged between deployed devices 102 and host entities 104. The information may include a time of the exchange, a size of the data packet, a sender, a destination, a deployed device type, and/or other associated information.

In some embodiments, the network traffic monitor 206 may access some, but not all, of information about a payload of a packet, such as a data packet type or basic information related to a type of transmission of the data packet (e.g., payment data, status indicator, alarm, etc.). In some embodiments, this information may be obtained by using codes associated with the data packet, such as codes that indicate a type of the data packet. The codes may be provided by an entity associated with the deployed device. Different deployed devices may provide different codes or different types of information in the payload of the packets. In most cases, if not all, the network traffic monitor 206 may not be able to decipher specific payload information, which may be encrypted or otherwise unreadable by the diagnostic entity 116. The network traffic monitor 206 may store information from the accessed network traffic in the historical data 214.

In some embodiments, the network traffic monitor 206 may access the network traffic for other reasons, such as to track network access for billing purposes, for auditing purposes, or for other reasons. For example, the diagnostic entity 116 may also perform billing, auditing, and/or other services that rely on monitoring the network traffic.

Figure 4:
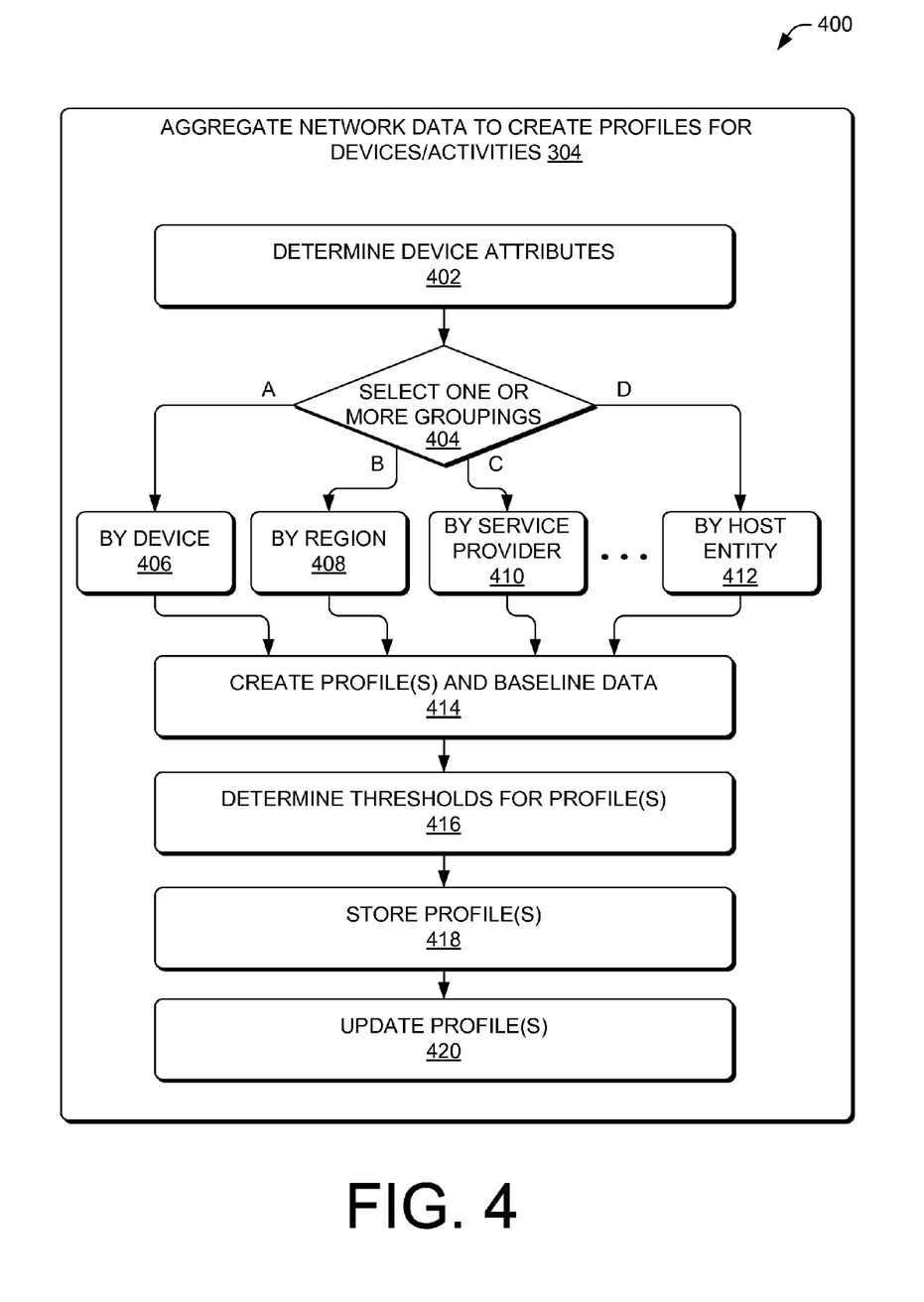
FIG. 4 is a flow diagram of an illustrative process to aggregate network data to create profiles of devices and/or network activity.

At 304, the profile module 208 may aggregate network data to create profiles for groups of the deployed devices and/or for activities performed by the deployed devices. The groups may be selected by the profile module 208 and may contain a same model of the deployed devices or different models, different types, different functionalities, and so forth. However, the deployed devices in a group may have some attributes that can be benchmarked such that comparison to the benchmark enables diagnosis of an aspect of deployed devices in the group, such as operational integrity of the deployed devices. At 304, the aggregating may form groups of the deployed devices, which include attributes, such as data packet size, frequency of transmission (packets per time period), schedule of transmission (time of day, etc.), location information, and so forth. In some embodiments, a set of deployed devices of a same model may be separated into different profiles based on location (or other attributes), such as to accommodate differences in the location, such as weather, time zones, and so forth. The deployed devices may be separated into different profiles for other reasons, such as based on service providers, host entities, and/or other attributes, which may or may not affect the performance of the deployed devices. For example, when some deployed devices use a faster network, having higher bandwidth or faster data exchange, the deployed devices may operate differently than similar or same deployed devices that use a slower network. Thus, these deployed devices may be separated into groups, each having different profiles, if such network differences are associated with meaningful diagnostic information. FIG. 4 provides additional details about the operation 308.

At 306, the event analyzer 210 may identify deployed devices that are outlier devices based on the profiles associated with such deployed devices. For example, the event analyzer 210 may compare attributes of a data packet from a deployed device to baseline data and/or threshold variances of the baseline data in a corresponding profile of the deployed device. In some embodiments, the event analyzer may extract information from two or more packets from the deployed device, such as to determine a frequency of transmission of data. Multiple data packets may be used to determine other information, such as overall volume of data packets during a time period. In various embodiments, the event analyzer 210 may determine outlier devices based on a lack of activity or a lack of data packets, such as when a deployed device has not transmitted a data packet in more than a threshold amount of time or has transmitted less than a threshold quantity of data packets in a predetermined amount of time.

Figure 5:
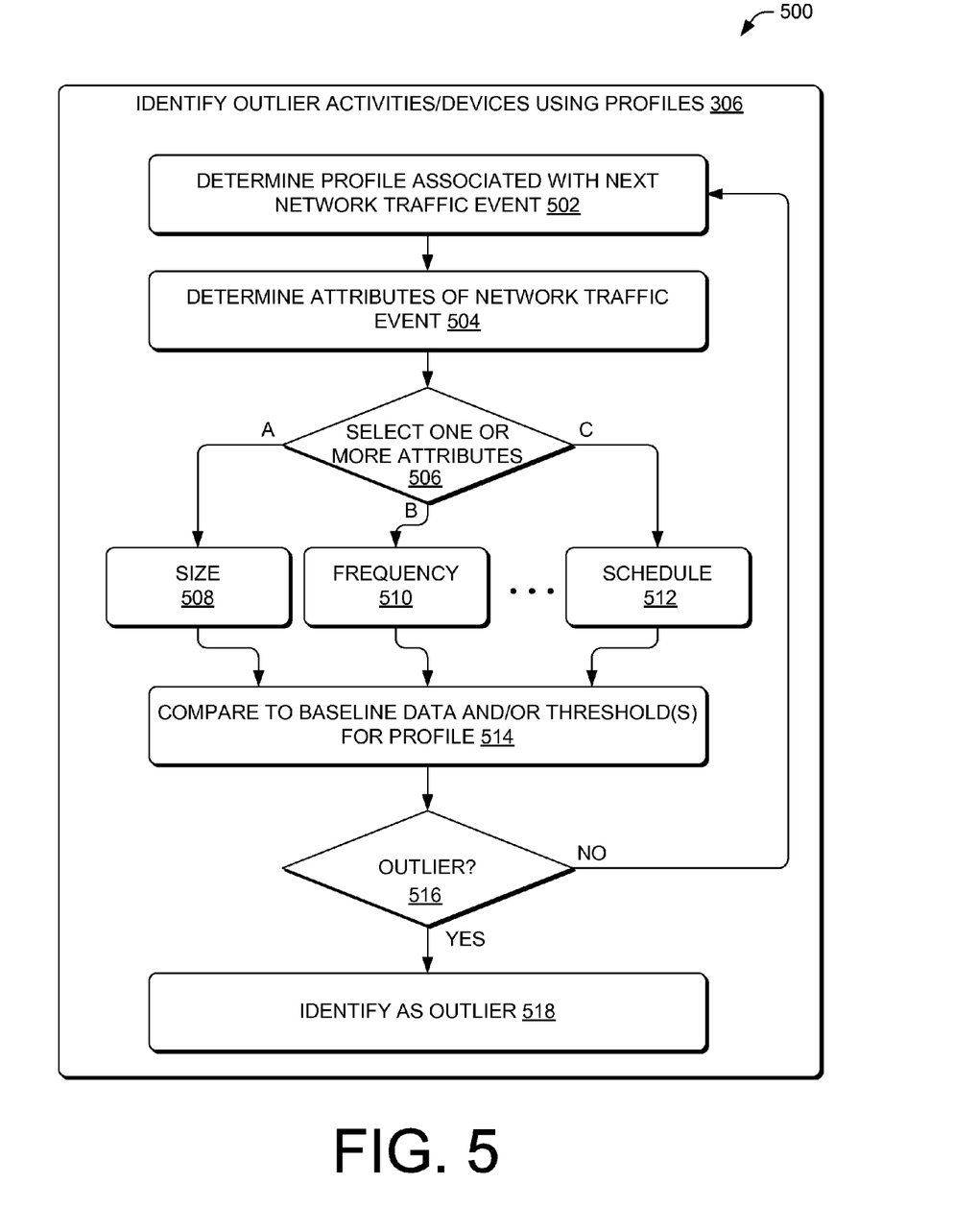
FIG. 5 is a flow diagram of an illustrative process to identify outlier activities and/or devices associated therewith using created profiles.

In some embodiments, the event analyzer 210 may perform queries of the historical data 214 and/or profile data 216 to determine information about one or more of the deployed devices. The queries may be created and deployed by humans (e.g., as ad hoc queries, etc.) and/or may be preconfigured queries that are periodically run (e.g., for updating baseline information, etc.). FIG. 5 provides additional details about the operation 306.

Figure 6A:
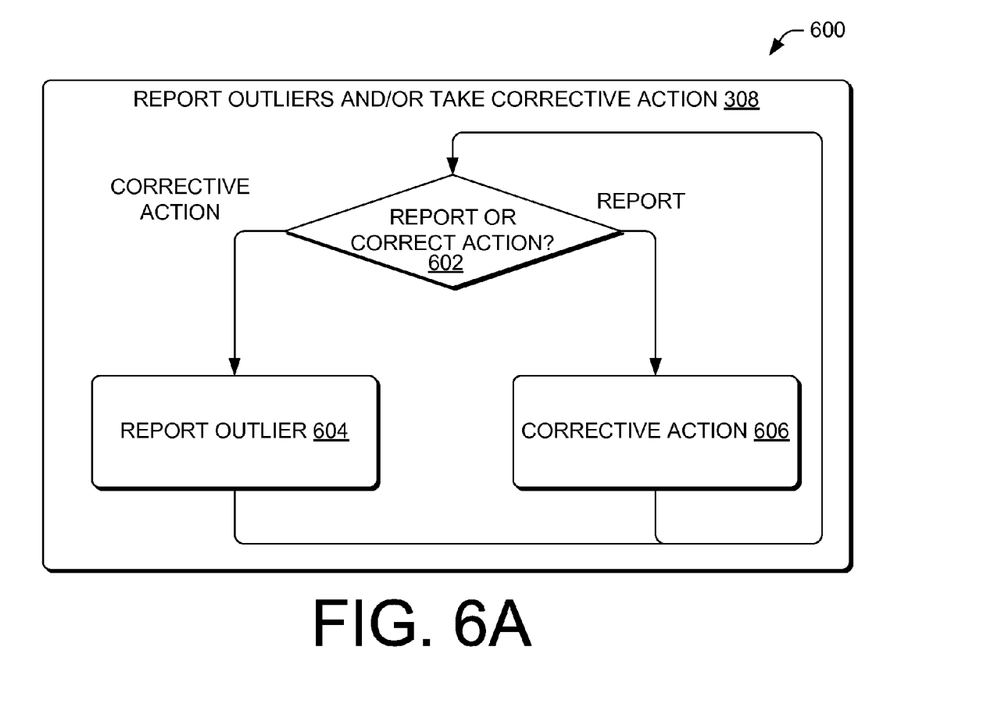
FIGS. 6A-6C are flow diagrams of illustrative processes to report outlier devices/actions and/or take corrective action.
Figure 6B:
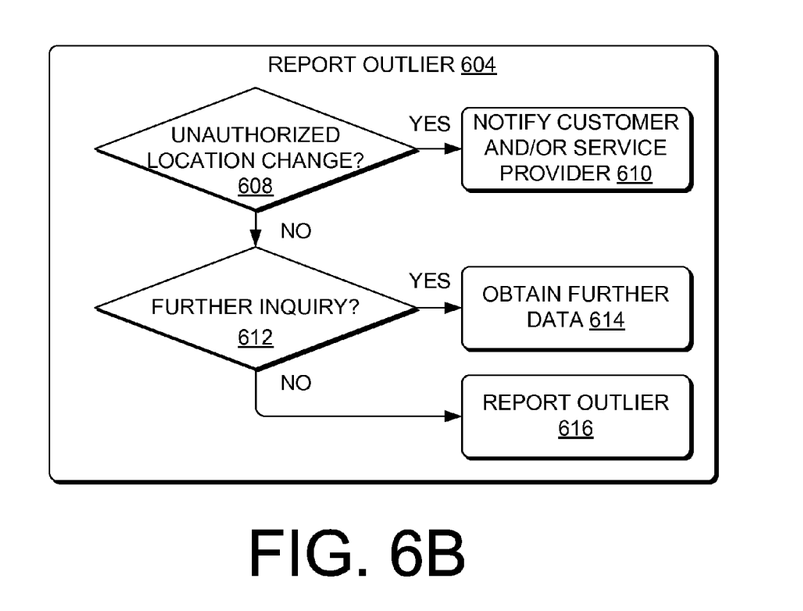
Figure 6C:
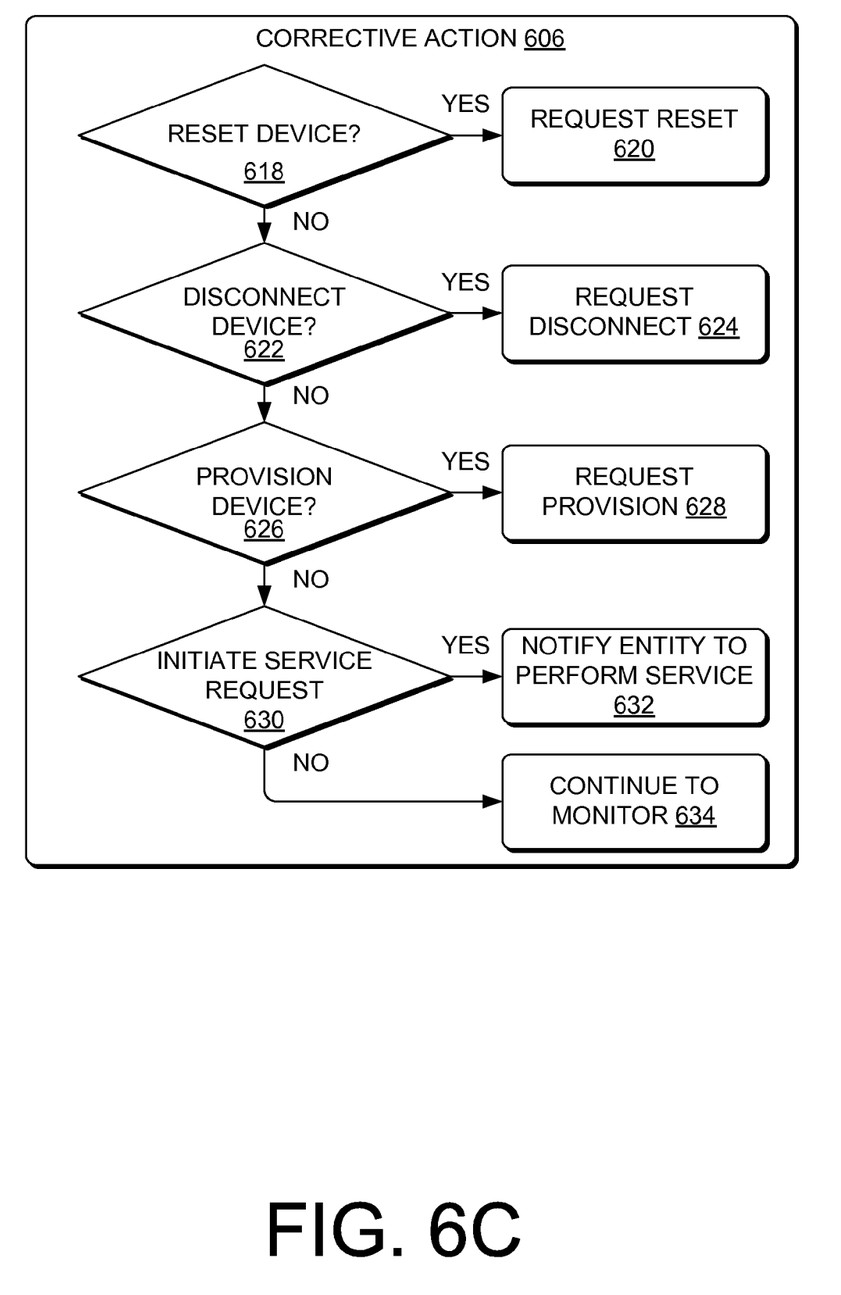

At 308, the report module 212 may report outlier deployed devices and/or cause corrective action to be performed for deployed devices identified via the operation 306. For example, the event analyzer 210 may determine that a deployed device has not transmitted a packet in more than a threshold amount of time or has transmitted more than a threshold amount of data packets in a threshold amount of time (e.g., more than expected), and may then transmit a notification or message to an associated entity to report the activity or lack thereof of the deployed device. In some embodiments, the report module 212 may cause corrective action to be taken for a deployed device, such as by causing a deployed device to be reset, disconnected, provisioned, to be serviced by software and/or by a human, or for other corrective action to be taken by an entity or device. FIGS. 6A-6C provides additional details about the operation 308.

FIG. 4 is a flow diagram of an illustrative process 400 to aggregate network data to create profiles of devices and/or network activity. The process 400 is described with reference to the environment 100 and the computing architecture 200. Of course, the process 400 may be performed in other similar and/or different environments. The process 400 provides additional details about the operation 304 described above with reference to the process 300.

At 402, the profile module 208 may determine attributes of one or more deployed devices that may be grouped into a profile. For example, the profile module 208 may analyze the historical data and determine that deployed devices in a group typically transmit similar sized data packets. The deployed devices may be of a same type (e.g., same model number, made by a same company, configured to perform a similar function, etc.) or may be of different types. In some embodiments, the profile module 208 may determine that a same type of devices includes attributes that vary based on one or more factors, such as time of day, region, service provider, host entity, and/or vary based on other information, but are otherwise similar when isolated based on the one or more factors. Thus, at 402, the profile module 208 may analyze the historical data to identify trends for deployed devices, where the trends are indicative of a device being operation or non-operational, among many types of indications or inferences that can be made using network traffic data. The profile module 208 may then enable the diagnostic entity to provide meaningful diagnostic data when used as baseline data. In some embodiments, the profile module 208 may be trained using known data, such as data from known problematic devices (data packets that indicate a need for a report or corrective action), and thus provide information to allow the profile module 208 to create profiles to isolate such known problematic devices. As an example, a deployed device may be identified as problematic when it transmits a data packet that is greater than a threshold size. The profile module 208 may create a profile for that particular deployed device type (e.g., for that model, etc.) based on the size of the data packet. Other similar deployed devices having a same known problem may be grouped in a same profile.

At 404, the profile module 208 may select one or more groupings for deployed devices to create one or more profiles. As discussed above, a quantity of deployed devices that are the same may be divided into multiple profiles, may have a single profile for itself, or may be share a profile with different deployed devices (yet possibly similar devices). The groupings may be based on one or more of the type of device at 406 (following a route "A"), the location or region at 408 (following a route "B"), the service provider at 410 (following a route "C"), the host entity at 412 (following a route "D"), and/or based on other attributes or information as discussed herein. Thus, profiles may be formed from different attributes about the deployed devices to create baseline information used for diagnostic purposes.

At 414, the profile module 208 may create one or more profiles based at least in part on the groups. The profiles may include identification of the deployed device(s), attributes of the deployed devices in the profile, baseline information (e.g., averages, median values, etc.), and/or other information representative of the deployed devices in the profile.

At 416, the profile module 208 may create thresholds for at least some of the information in the profiles. The thresholds may indicate outliner devices, when the devices match or are associated with a profile, but include attributes that are outside of the thresholds that are established at the operation 416. The thresholds may be based on statistical confidence intervals, on known problems, set by humans, and/or created using other data or profiling. The threshold variance may be a percentage or a fixed value.

At 418, the profile module 208 may store the profiles in the profile data 216. The profile data may be a database that stores profiles and attributes, and/or stores profiles for associated devices, and queries for each profile that determine the baseline data and threshold data using the historical information 214.

At 420, the profile module 208 may update the profiles and/or information associated with the profiles based on a passage of time, new data from the network traffic monitor 206, changes to the historical data 214, and/or for other reasons. Thus, the profile data 216 may be updated and maintained over time. In some embodiments, the profile module 208 may track a device before and after a reprovisioning event to maintain historical information about the device. For example, when a device is reprovisioned to work on a new network, but is still expected to operate in a same or similar manner as previously observed/measured, then the profile module 208 may maintain the historical information prior to the reprovisioning, such as by linking this information to the device after the reprovisioning FIG. 5 is a flow diagram of an illustrative process 500 to identify outlier activities and/or devices associated therewith using created profiles. The process 500 is described with reference to the environment 100 and the computing architecture 200. Of course, the process 500 may be performed in other similar and/or different environments. The process 500 provides additional details about the operation 306 described above with reference to the process 300.

At 502, the event analyzer 210 may determine a profile associated with a next traffic network event. For example, in response to the network traffic monitor 206 identifying a next packet of data associated with a deployed device, the event analyzer 210 may analyze that data packet to determine a profile associated with the data packet. In some embodiments, additional attributes may be analyzed to determine the profile, such as regional information, service provider information, host entity information, and so forth, which is used to create and distinguish deployed devices in different profiles as discussed with reference to FIG. 4.

At 504, the event analyzer 210 may determine attributes of the network traffic event. In some embodiments, the attributes may be discoverable from inspection of the data packet, such as a size of the data packet, a time of receipt of the data packet, sender information, recipient information, and so forth. However, in some instances, one or more attributes may not be readily discoverable without further processing. In some embodiments, attributes may be determined by using other data packets associated with the deployed device, which may be stored in the historical data 214. For example, this information may be used to determine a frequency or quantity of information from the deployed device. In various embodiments, attributes may be determined using data from other sources, such as codes used to decipher a type of packet or information from a service provide or host entity that provides details about a deployed device that sent the data packet.

At 506, the event analyzer 210 may select one or more attributes of the data packet to analyze in comparison to data (e.g., baseline information, thresholds, etc.) associated with a corresponding profile. The attributes may include a size (following a route "A"), a frequency at 510 (following a route "B"), a schedule at 512 (following a route "C"), and/or other attributes as discussed herein.

At 514, the selected attributes may be compared to baseline data and/or threshold(s) or threshold variances from the baseline data of the corresponding profiles determined from the operation 502. For example, a size of the packet determined at the operation 504 may be compared to a threshold size of the packets at the operation 514. Other attributes may be compared together or separately in the operation 514 to determine whether a deployed device associated with the data packet is to be reported or to undergo corrective actions, as discussed above.

At 516, the event analyzer 210 may determine whether the attribute(s) compared at the operation 514 indicate that a device or data is an outlier such that the attributes falls outside of the threshold ranges for acceptable data or otherwise indicates a notable variance to be reported or corrected. When the event analyzer 210 determines that an attribute is an outlier (following the route "yes" from the decision operation 516), then the process 500 may advance to an operation 518. At 518, the event analyzer 210 may identify or label the event, the data packet, and/or the deployed device as an outlier. However, when the event analyzer 210 determines that analyzed attribute(s) is/are not outlier(s) (following the route "no" from the decision operation 516), then the process 500 may advance to the operation 502 and continue to process a next data event from a next data packet.

FIG. 6A is a flow diagram of an illustrative process 600 to report outlier devices/actions and/or take corrective action. The process 600 is described with reference to the environment 100 and the computing architecture 200. Of course, the process 600 may be performed in other similar and/or different environments. The process 600 provides additional details about the operation 308 described above with reference to the process 300.

At 602, the report module 212 may determine whether to report an outlier deployed device (e.g., a deployed device identified at the operation 518, etc.) or to cause corrective action to be performed. The determination may be based on various factors, such as an ability to cause corrective action, preferences of other entities, a quantity/extent of outlier data, and/or other possible factors. When the report module 212 determines to report an outlier (following the "report" route from the decision operation 602), then the process 600 advances to the report outlier operations at 604. When the report module 212 determines to cause corrective action (following the "corrective action" route from the decision operation 602), then the process 600 advances to the corrective action operations at 606. Each set of operations is described in turn in FIGS. 6B and 6C, respectively. In some instances, both corrective action and reports may be determined to be output at the decision operation 602. As shown in FIG. 6A, the process 600 may include a loop, which may result in further occurrences of the decision operation 602.

FIG. 6B shows the report outlier operations 604. At 608, the event analyzer 210 may make a determination of whether a change in location of a device has been detected. The location change may be detected based on an IP address associated with a sender of the data packet or from other location associated data. A profile may indicate whether the location change is permissible or flagged for reporting. When an unauthorized location change is detected (following the "yes" route from the decision operation 608), then the process may advance to an operation 610. At 610, the report module 212 may notify a customer, a service provider, and/or another entity associated with the deployed device about the location change of the deployed device. When an unauthorized location change is not detected (following the "no" route from the decision operation 608, then the process may advance to a decision operation 612.

At 612, the report module 212 may determine whether to perform a further inquiry about a deployed device before reporting an activity. For example, the report module 212 may delay an action and wait to see if additional data from a subsequent data packet from the same deployed device also includes outlier data or the report module may request further data from another entity or source. When the report module 212 determines to perform a further inquiry (following the "yes" route from the decision operation 612), then the process may advance to an operation 614. At 614, the report module 212 may cause delay of reporting until subsequent relevant data is received (e.g., via accessing/monitoring network traffic for new data packets) and/or may transmit an inquiry to for further data from another entity or source. When the report module 212 determines not to perform a further inquiry (following the "no" route from the decision operation 612), then the process may advance to an operation 616. At 616, the report module 212 may report the outlier data to an associated entity or multiple entities. The report may include the data packet and/or information from the data packet or derived from the data packet, information from a profile, such as baseline and/or threshold information, a reason for the report, and/or other relevant information to allow a recipient to understand the report.

FIG. 6C shows the corrective action operations 606. At 618, the reporting module 212 may make a determination of whether to cause a deployed device to be reset. A reset may cause the deployed device to be powered off and then powered back on to clear memory and/or initiate running of some software by the deployed device. The reset may be caused directly by the report module 212 (e.g., by transmission of a packet instructing a reset to the deployed device) and/or by causing the reset by transmitting a request to another entity that is capable of resetting the deployed device, such as the host entity associated with the device, a service provider, an end user, or another entity or person. When the device is to be reset (following the "yes" route from the decision operation 618), then the process may advance to an operation 620. At 620, the report module 212 may request the device to be reset. When the device is not to be reset, (following the "no" route from the decision operation 618), then the process may advance to a decision operation 622.

At 622, the reporting module 212 may make a determination of whether to cause a deployed device to be disconnected. The disconnect may be caused directly by the report module 212 (e.g., by transmission of a packet instructing a disconnect of the deployed device) and/or by causing the disconnect by transmitting a request to another entity that is capable of disconnecting the deployed device, such as the host entity associated with the device, a service provider, an end user, or another entity or person. When the device is to be disconnected (following the "yes" route from the decision operation 622), then the process may advance to an operation 624. At 624, the report module 212 may request the device to be disconnected. When the device is not to be disconnected, (following the "no" route from the decision operation 622), then the process may advance to a decision operation 626.

At 626, the reporting module 212 may make a determination of whether to cause a deployed device to be provisioned. The provisioning may update software/firmware of the device and/or otherwise change operation of the device. For example, provisioning may add a profile to a device to allow the device to correctly operate on a new or existing network. The provisioning may be caused directly by the report module 212 (e.g., by transmission of a packet instructing a provisioning of the deployed device) and/or by causing the provisioning by transmitting a request to another entity that is capable of provisioning the deployed device, such as the host entity associated with the device, a service provider, an end user, or another entity or person. When the device is to be provisioned (following the "yes" route from the decision operation 626), then the process may advance to an operation 628. At 628, the report module 212 may request the device to be provisioned. When the device is not to be provisioned, (following the "no" route from the decision operation 626), then the process may advance to a decision operation 630.

At 630, the report module 212 may initiate a service request to cause the deployed device to be serviced by software, by a person, or by both. For example the software service may be an update of firmware for the deployed device or other software changes, updates, upgrades, and so forth. The service by a person may include service performed by a service technician to inspect and possibly repair hardware of the deployed device and/or make other repairs, including loading software. When the service request is to be initiated (following the "yes" route from the decision operation 630), then the process may advance to an operation 632. At 632, the report module 212 may notify an entity to perform the service. When the service request is not to be initiated (following the "no" route from the decision operation 630), then the process may advance to an operation 634. At 634, the report module 212 may cause continued monitoring of the deployed device, such as by waiting for a subsequent data packet from the deployed device before taking corrective action or canceling possible corrective action.

Figure 7:
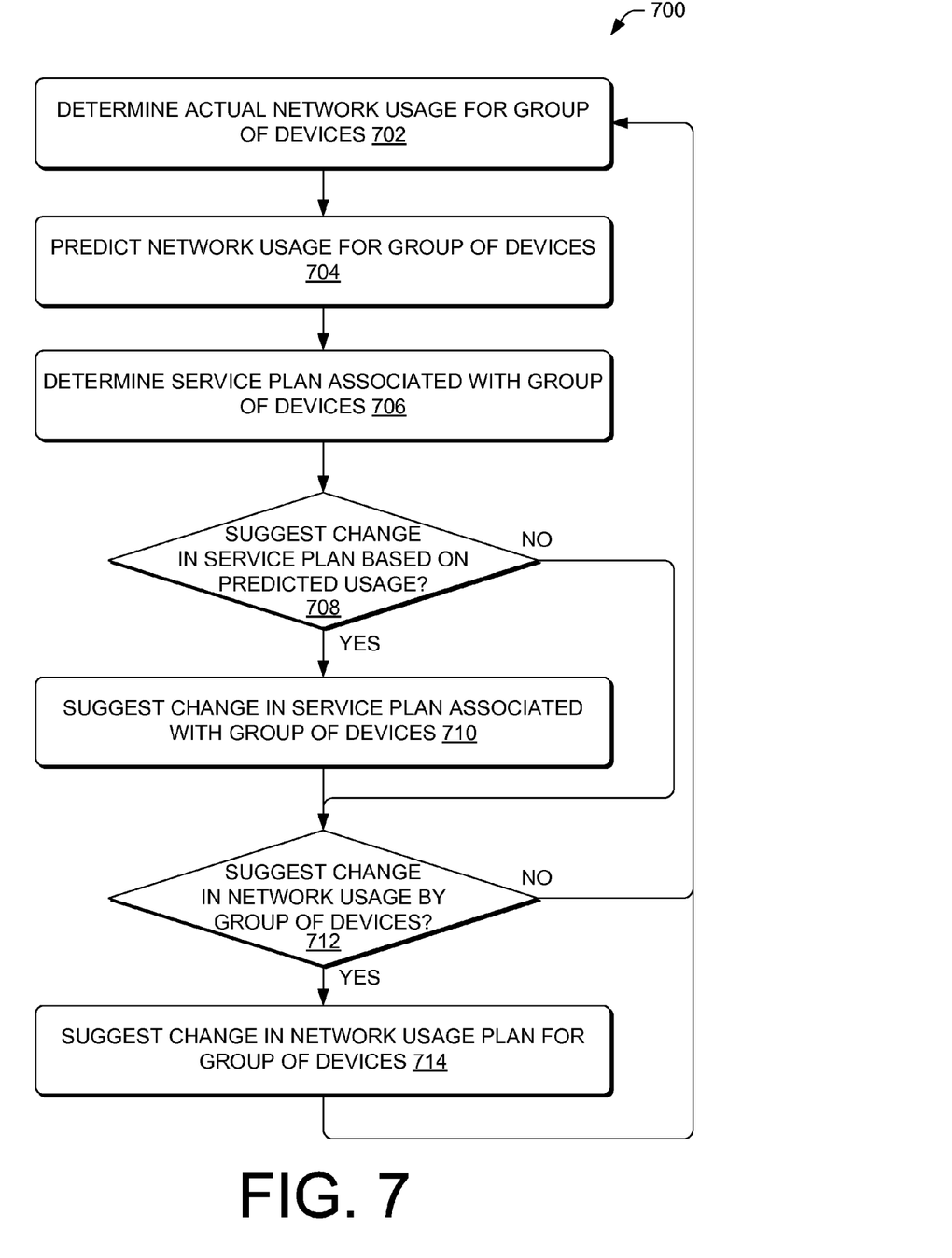
FIG. 7 is a flow diagram of an illustrative process to predicted network usage of a group of devices and to possibly suggest revisions to a service plan or revisions to usage of network resources based on the predicted network usage.

FIG. 7 is a flow diagram of an illustrative process 700 to predicted network usage of a group of devices and to possibly suggest revisions to a service plan or revisions to usage of network resources based on the predicted network usage. The process 700 is described with reference to the environment 100 and the computing architecture 200. Of course, the process 700 may be performed in other similar and/or different environments.

At 702, the diagnostic application 118 may determine actual network usage for a group of devices. For example, the diagnostic application 118 may determine the actual network usage for a group of deployed devices that are included under one or more profiles, include a common entity affiliation (e.g., share a same host entity, share a same service provider, etc.), or other otherwise selected for analysis. The actual network usage may be queried from the historical data 214 obtained by the network traffic monitor 206. Network usage may be measured by one or more of bytes/time period, quantity of packets transmitted, peak bandwidth, and/or other network usage attributes.

At 704, the diagnostic application 118 may predict network usage for the group of devices based at least in part on the historical data. For example, the diagnostic application 118 may predict an increase in a number of the deployed devices in the group of devices, and thus predict a corresponding increase in network usage. An increase in network usage may be predicted based on increased use of some of the devices, such as based on increased popularity of use of the deployed devices. For example, when a new service is initially offered, the volume of use may be smaller than after the service becomes popular and more widely used.

At 706, the diagnostic application 118 may determine a service plan associated with the group of devices. In some embodiments, the diagnostic application 118 may have access to billing information, and thus may determine a specific and actual service plan, parameters, usage limits, and so forth. In various embodiments, the diagnostic application 118 may estimate parameters of a service plan based on prior network usage and observed usage trends. Thus, the diagnostic application 118 may or may not have access to actual service plan information, but may be able to estimate service plan information when the actual service plan information is not available. The service plan may be estimated by identifying existing services plans available for use by the deployed devices, such as by analyzing current or prior market offerings of services plans. A service plan may include a price for an amount of network traffic, such as a price to process a predetermined amount of data over a predetermined amount of time.

At 708, the diagnostic application 118 may determine whether a service plan for the group of devices is likely to benefit from a revision based on the predicted usage. For example, when the predicted usage includes an increase or decrease in usage, then the diagnostic application 118 may recommend a modification in a service plan, or at least suggest an inquiry as to whether a better service plan is available (e.g., a cheaper plan, a more reliable plan, a faster network plan, etc.). When the diagnostic application 118 determines to suggest a change in the service plan based on the predicted usage (following the "yes" route from the decision operation 708), then the process 700 may advance to an operation 710. At 710, the diagnostic application 118 may suggest a change in a service plan. For example, the diagnostic application 118 may transmit a notification to an entity associated with the group of devices to suggest revising a service plan to a specific different service plan or to suggest researching available service plans. In some embodiments, the diagnostic application 118 may suggest alternative plans that may be beneficial for the group of devices based at least in part on the predicted network usage determined at the operation 704. When the diagnostic application 118 determines not to suggest a change in the service plan based on the predicted usage (following the "no" route from the decision operation 708), then the process 700 may advance to a decision operation 712.

At 712, the diagnostic application 118 may determine whether network usage for the group of devices is likely to benefit from revision based on the predicted usage. For example, the diagnostic application 118 may determine that the group of devices may be able to transmit less information, offset network usage to other, cheaper periods of time (e.g., batch processing at night, etc.), and/or make other modifications to reduce network usage or shift network usage to other times, and thus possible avoid increased costs of a different service plan. The determination may be based on an analysis of the network usage of at least some of the deployed devices in comparison to other deployed devices. When the diagnostic application 118 determines to suggest a change in network usage by the group of devices (following the "yes" route from the decision operation 712), then the process 700 may advance to an operation 714. At 714, the diagnostic application 118 may suggest a change in the network usage by the group of devices. For example, the diagnostic application 118 may transmit a notification to an entity associated with the group of devices to suggest modifying network usage by making specific changes (e.g., batch data, transmit at different times, streamline transmissions, etc.) or to suggest researching other ways to reduce network usage. When the diagnostic application 118 determines not to suggest a change in network usage by the group of devices (following the "no" route from the decision operation 712), then the process 700 may advance to the operation 702. Thus, in some instances, the process 700 may repeat one or more times.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of monitoring devices deployed by third parties based on network activity, the method comprising:
   receiving, via one or more computing devices, network traffic between a plurality of deployed devices and respective host devices, the deployed devices being end-point devices that automatically transmit packets of data to respective host devices;
   aggregating the network traffic to create individual profiles for different groups of the deployed devices, the individual profiles including at least a packet size and a transmission frequency representative of a respective group of the deployed devices;
   identifying, from the network traffic, a deployed device of the plurality of deployed devices that transmits a packet of data outside of at least one of a threshold size variance of the packet size or a threshold frequency variance in the transmission frequency based at least in part on a respective profile for the deployed device from the individual profiles; and
   transmitting a notification to at least one of a service provider or a host device of the respective host devices that is associated with the deployed device, the notification identifying the packet of data as being outside of at least one of the threshold size variance of the packet size or the threshold frequency variance in the transmission frequency.

2. The method as recited in claim 1, further comprising causing the deployed device to be at least one of reset, a disconnected, or provisioned based at least in part on the packet of data being outside of at least one of the threshold size variance of the packet size or the threshold frequency variance in the transmission frequency.

3. The method as recited in claim 1, wherein the notification includes a service request to perform service on the deployed device.

4. The method as recited in claim 1, wherein the individual profiles further include the threshold size variance of the packet size and the threshold frequency variance in the transmission frequency.

5. The method as recited in claim 1, wherein the different groups are based at least in part on different types of the deployed devices.

6. The method as recited in claim 1, wherein the different groupings are based at least in part on different locations of the deployed devices.

7. The method as recited in claim 1, wherein the different grouping are based at least in part on different functions of the deployed devices.

8. The method as recited in claim 1, wherein the packets of data include at least one of payment information or status information from respective ones of the deployed devices.

9. The method as recited in claim 1, further comprising:
   estimating a predicted future amount of network traffic for a group of the deployed devices based at least in part on the aggregated network traffic; and
   generating a report that includes the predicted future amount of network traffic for the group of the deployed devices.

10. The method as recited in claim 9, wherein the report includes a recommendation to select a specific service plan to provide network service for the group of deployed devices.

11. One or more non-transitory computer-readable media storing computer-executable instructions that, when executed on one or more processors, performs acts comprising:
    receiving, via one or more computing devices, network traffic from a plurality of deployed devices that transmit packets of data to respective host devices;
    aggregating the network traffic to create individual profiles for different groups of the deployed devices, the individual profiles including at least one of a packet size or a transmission frequency representative of a group of the deployed devices; and
    analyzing a subsequent packet of data to determine an associated profile associated with the subsequent packet of data from the individual profiles;
    identifying, based at least in part on the subsequent packet of data and the associated profile, a deployed device of the plurality of deployed devices that transmits the subsequent packet of data outside of at least one of a threshold size variance of the packet size or a threshold frequency variance in the transmission frequency.

12. The one or more non-transitory computer-readable media as recited in claim 11, wherein the acts further comprise transmitting a notification to an entity that is associated with the deployed device, the notification identifying the subsequent packet of data as being outside of at least one of the threshold size variance of the packet size or the threshold frequency variance in the transmission frequency.

13. The one or more non-transitory computer-readable media as recited in claim 12, wherein the notification includes a service request to perform service on the deployed device.

14. The one or more non-transitory computer-readable media as recited in claim 11, wherein the packets of data include at least one of payment information or status information from respective deployed devices.

15. The one or more non-transitory computer-readable media as recited in claim 11, wherein the acts further comprise:
- estimating a predicted future amount of network traffic for a group of the deployed devices based at least in part on the aggregated network traffic; and
- generating a report that includes the predicted future amount of network traffic for the group of the deployed devices.

16. The one or more non-transitory computer-readable media as recited in claim 15, wherein the report includes a recommendation to select a specific service plan to provide network service for the group of deployed devices.

* * * * *